US007316355B2

(12) United States Patent
Canipe et al.

(10) Patent No.: US 7,316,355 B2
(45) Date of Patent: Jan. 8, 2008

(54) SYSTEM AND METHOD FOR OPTIMIZING RANGE OF AN ELECTRONIC ARTICLE SURVEILLANCE SYSTEM

(75) Inventors: Larry Canipe, Boca Raton, FL (US); Steven V. Leone, Lake Worth, FL (US); Dan Haberstich, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 143 days.

(21) Appl. No.: 10/412,741

(22) Filed: Apr. 11, 2003

(65) Prior Publication Data

US 2004/0011873 A1    Jan. 22, 2004

Related U.S. Application Data

(60) Provisional application No. 60/372,016, filed on Apr. 11, 2002.

(51) Int. Cl.
G06K 7/10    (2006.01)
(52) U.S. Cl. .................... 235/462.31; 235/462.13; 235/462.33
(58) Field of Classification Search .......... 235/462.31, 235/462.13, 383, 385, 462.33; 705/28; 340/572.1, 340/572.2, 572.3, 572.4, 572.5
See application file for complete search history.

(56) References Cited

U.S. PATENT DOCUMENTS 4,476,469 A * 10/1984 Lander .................. 340/825.49
5,027,106 A *  6/1991 Lizzi et al. ............... 340/572.3
5,469,142 A * 11/1995 Bergman et al. .......... 340/572.3
5,598,007 A *  1/1997 Bunce et al. ........... 235/462.45
5,600,121 A     2/1997 Kahn et al. .................. 235/472
6,056,199 A *  5/2000 Wiklof et al. .......... 235/462.45
6,097,420 A *  8/2000 Baba et al. ................. 347/258
6,281,796 B1*  8/2001 Canipe et al. ............ 340/572.3
6,542,083 B1*  4/2003 Richley et al. ......... 340/825.49
6,636,535 B1* 10/2003 Iwashita et al. ................ 372/6
6,671,646 B2* 12/2003 Manegold et al. .......... 702/127
6,681,994 B1*  1/2004 Koenck ................. 235/472.01
6,693,512 B1*  2/2004 Frecska et al. ............ 340/10.1
6,700,489 B1*  3/2004 Easter et al. ........... 235/472.01
2003/0075602 A1*  4/2003 Wike et al. .................. 235/383

FOREIGN PATENT DOCUMENTS

JP        2001099647 A  *  4/2001

* cited by examiner

Primary Examiner—Uyen-Chau N Le
(74) Attorney, Agent, or Firm—Alan M. Weisberg; Christopher & Weisberg, P.A.

(57) ABSTRACT

An electronic article surveillance (EAS) system including: an EAS device and an EAS range finder system for providing indication as to when the EAS device is within an operational distance from the EAS tag. The system may include a barcode scanner for providing an output having a distinct visible pattern when the operational distance is achieved. An energy source may be provided, and the EAS system may determine when the operational distance is achieved by detection of energy reflected from an article carrying the EAS tag.

22 Claims, 2 Drawing Sheets

SYSTEM AND METHOD FOR OPTIMIZING RANGE OF AN ELECTRONIC ARTICLE SURVEILLANCE SYSTEM

CROSS-REFERENCE TO RELATED APPLICATIONS

The present application claims the benefit of the filing date of U.S. Provisional Application Ser. No. 60/372,016, filed Apr. 11, 2002, the teachings of which are incorporated herein by reference.

FIELD OF THE INVENTION

The present invention relates to electronic article surveillance (EAS), and, more particularly, to a system and method for optimizing the range of an EAS system.

BACKGROUND OF THE INVENTION

A variety of EAS systems are well known for the prevention or deterrence of unauthorized removal of articles from a controlled area. In a typical EAS system, tags designed to interact with an electromagnetic field located at the exits of the controlled area are attached to articles to be protected. If a tag is brought into the electromagnetic field or "interrogation zone", the presence of the tag is detected and appropriate action may be taken. For a controlled area such as a retail store, the appropriate action taken for detection of an EAS tag may be the generation of an alarm. Some types of EAS tags remain attached to the articles to be protected, but are deactivated prior to authorized removal from the controlled area by a deactivation device that changes a characteristic of the tag so that the tag will no longer be detectable in the interrogation zone.

EAS tag deactivation devices may be fixed at a specific location, such as adjacent a point-of-sale (POS) station in a retail environment. A barcode scanner may also be located at the POS station for scanning a barcode affixed to an article. Barcode systems and scanners are well known. Barcodes may be used for a variety of purposes, such as inventory control and for managing POS transactions. In a typical POS transaction, upon purchase of an article, the barcode is scanned at a POS station. The barcode represents a reference number that is communicated to a computer to look up an associated record containing descriptive data such as product name, vendor name, price, quantity-on-hand, etc. The computer does a "price lookup" and displays the price on the cash register. The computer may also subtract the quantity purchased from the quantity-on-hand and perform other informational or management functions related to the purchased products.

Combined systems incorporating both an EAS system and a barcode scanner have been developed to increase the efficiency of scanning barcodes and modifying the activation state of an EAS tag. Such systems have been provided in both fixed and handheld configurations. In these systems, an article may be placed adjacent the combined EAS/Scanner to perform both the barcode scanning function and modification of the activation state, e.g. deactivation, of an EAS tag.

Unfortunately, however, it is possible with such systems to orient an item at a sufficient distance from the combined EAS/Scanner to achieve a valid barcode scan, but at an insufficient distance to reliably modify the activation state of the EAS tag. If an EAS tag is inadvertently not deactivated at the deactivator adjacent the POS station, the EAS tag will set off an alarm at the store exit. To then deactivate the EAS tag, the article must be returned to the EAS/Scanner, which causes customer confusion and embarrassment.

Accordingly, there is a need for a system and method for optimizing the range of an EAS system to ensure reliable EAS tag modification.

SUMMARY OF THE INVENTION

A system consistent with the invention includes a variety of aspects. According to one aspect of the invention there is provided an electronic article surveillance (EAS) system including: an EAS device configured for modifying an activation state of an EAS tag; and an EAS range finder system configured for providing an operational indication when the EAS device is within an operational distance from the EAS tag for detecting or modifying the activation state of the EAS tag.

According to another aspect of the invention, the EAS system may be configured as a combined EAS/Scanner system including an EAS device, a barcode scanner, and an EAS range finder system. The barcode scanner may include a barcode scanner light source and a mirror configured to reflect the barcode scanner light source on an article carrying the tag. The EAS range finder system may include a controller configured to control the mirror for establishing a barcode scanner output that is visible on an article carrying the tag, the output having a first visible characteristic when the EAS device is outside of the operational distance and a second visible characteristic different from the first visible characteristic when the EAS device is within the operational distance. The operational indication may include the second visible characteristic.

According to another aspect of the invention, the EAS range finder system may include an energy source for transmitting energy and a detector for detecting a reflected portion of the energy reflected from an article carrying the EAS tag. The operational indication may be provided in response to the reflected portion of the energy.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof including a combined EAS and barcode scanner device. Those skilled in the art will recognize, however, that the features and advantages of the present invention may be implemented in a variety of configurations. For example, the present invention may be incorporated into a fixed or portable EAS device or a combined EAS/Scanner device. It is to be understood, therefore, that the embodiments described herein are presented by way of illustration, not of limitation.

Figure 1:
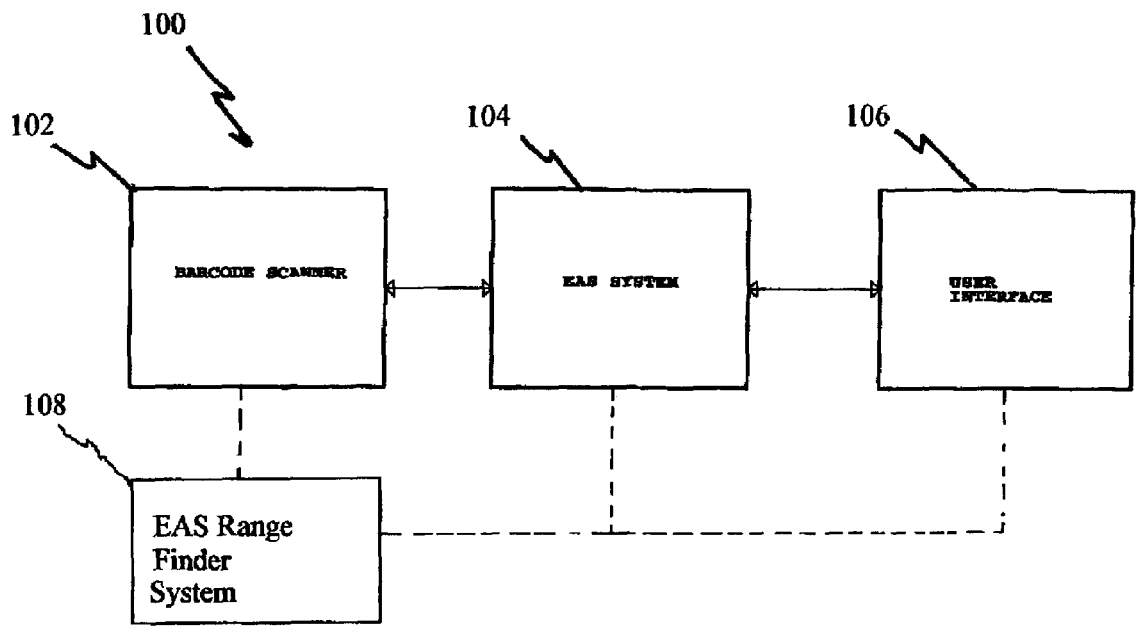
FIG. 1 is a block diagram of an exemplary a combined EAS device and barcode scanner including an EAS range finder system consistent with the invention.

Turning now to FIG. 1, there is illustrated a block diagram of an exemplary combined EAS/Scanner 100 including an EAS range finding system consistent with the invention. The illustrated exemplary embodiment includes a barcode scanner 102, an EAS system 104, a user interface 106, and an EAS range finding system 108. The barcode scanner 102 may be any of a variety of well known and commercially available barcode scan engines, such CCD or Laser based systems. The barcode scanner 102 may be interfaced with the EAS system 104 via control input/output (I/O) connections and a serial communications line.

The EAS system 104 may be configured to detect and/or modify the activation state, i.e. to deactivate, activate and/or reactivate, of any type of EAS tag/marker. Those skilled in the art will recognize that multiple types of EAS tags exist. The three most common types of EAS tags are EM (electromagnetic), RF (Radio-Frequency), and AM (Acousto-Magnetic). The three different types only work within their respective detection, activation, and deactivation systems. A variety of transmitter and receiver systems for exciting and detecting the presence of such tags are well known and are commercially available. Accordingly, the basic methods of exciting and detecting such tags will not be repeated here. The EAS system 104 may interface with the barcode scanner 102 and the user interface 106.

The user interface 106 may provide a mechanism for facilitating user input to the system, and may include a display, e.g. an LCD display, for displaying information to a user. The user interface 106 may be configured to allow a user to change operating modes, enter security codes to enable the device, and to provide information regarding the article being processed. The user interface may also include a backlight button and a power on/off button.

Advantageously, the EAS range finder system 108 provides an indication to a user when the EAS/Scanner is positioned at an operational distance from the EAS tag. The term "operational distance" as used herein refers to a distance at which the EAS system 104 is at a sufficient distance from an EAS tag to detect or modify the activation state of the EAS tag. Because the barcode is typically located on an EAS tag or within a predetermined proximity to the EAS tag, e.g., 3 inches or less, and the EAS system 104 is located in proximity to the scanner, the distance from the barcode to the scanner can be used to extrapolate the distance from the EAS system 104 to the EAS tag. The distance from the barcode to the scanner can thus be utilized to determine if the EAS tag at an operational distance from the EAS tag 104.

Depending on the configuration of the EAS range finder system 108, the system may be connected or a component of the barcode scanner 102 and/or the EAS system 104, or may be a stand alone system, as indicated by the phantom connections between the EAS range finder system, the barcode system and the EAS system. In addition, the EAS range finder system 108 may be connected directly to the user interface 106 for providing a visual or audible indication that the device is within an operational distance, or it may be connected to the user interface through other elements, such as the barcode scanner and/or the EAS system. The EAS range finder system 108 may also be configured to provide a simple direct visual indication to a user on an article carrying an EAS tag, with or without providing a visual or audible indication at the user interface.

Figure 2:
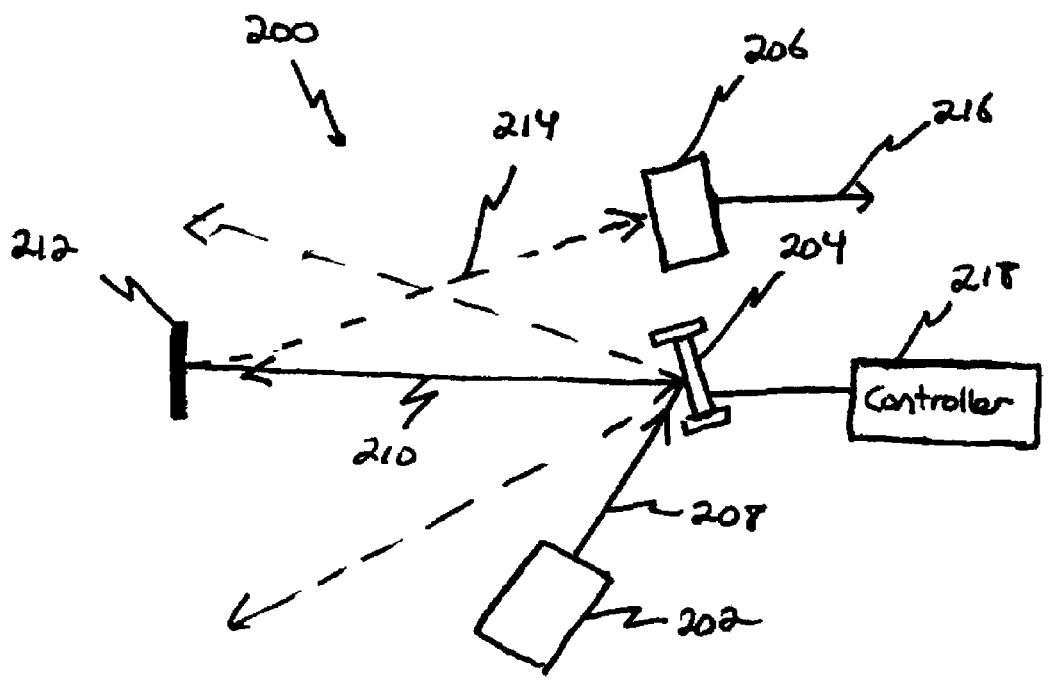
FIG. 2 is a block diagram of a portion of an exemplary combined EAS device and barcode scanner including an EAS range finder system consistent with the invention.

FIG. 2 is a block diagram of one exemplary embodiment of a combined EAS/Scanner system consistent with the present invention, wherein a direct visual indication is provided on an article carrying an EAS tag, e.g. on or adjacent to a scanned barcode, when the EAS system 104 is within an operational distance from an EAS tag. The illustrated exemplary embodiment 200 includes a barcode scanner system of the laser type. Laser-based barcode scanners generally include a laser 202, a mirror 204, and a light sensitive element 206, e.g., a photocell. The laser emits a light beam 208 that is directed toward the mirror 204, which oscillates to reflect the laser output 208 as a scanner output 210 that sweeps across a barcode 212. Light 214 reflected from the barcode 212 is sensed by the light sensitive element 206, which provides an output 216 representative of the barcode. As will be recognized by those skilled in the art, the output of the photocell may be provided to processing electronics for conditioning.

Consistent with the present invention, a controller 218 may be provided for controlling the orientation of the mirror 204 to create a scanner output 210 having a distinct characteristic or pattern when the EAS system of the EAS/Scanner is within an operational distance. For example, the controller 218 may be programmed with appropriate software instructions to provide a scanner output 210 having a circular pattern. At a distance from the barcode greater than an operational distance for the EAS device, the circular pattern may appear in an annular pattern on the article carrying the EAS tag, i.e. with an opening in the middle of the circle. As the distance between the EAS/Scanner and the barcode is decreased, the opening in the circle may close to the point where the circular pattern is no longer annular, but is solid with no central opening. The presence of a solid circular pattern may provide a visual indication to a user that the EAS device is within an operational distance.

The controller 218 may be programmed to control the mirror to establish any of a variety of patterns, such as circular, rectangular, linear, etc. Preferably, however, the controller is configured to provide a pattern having a distinct characteristic when the EAS device is within the operational distance. In particular, at a distance greater than an operational distance, the pattern should have a first characteristic different from a second characteristic appearing when the operational distance is reached. Those skilled in the art will recognize that this may be accomplished, for example, by programming the controller to provide an output having a continuous or discontinuous pattern that appears to converge on the article carrying the tag as the distance between the EAS/Scanner and the article is decreased.

Figure 3:
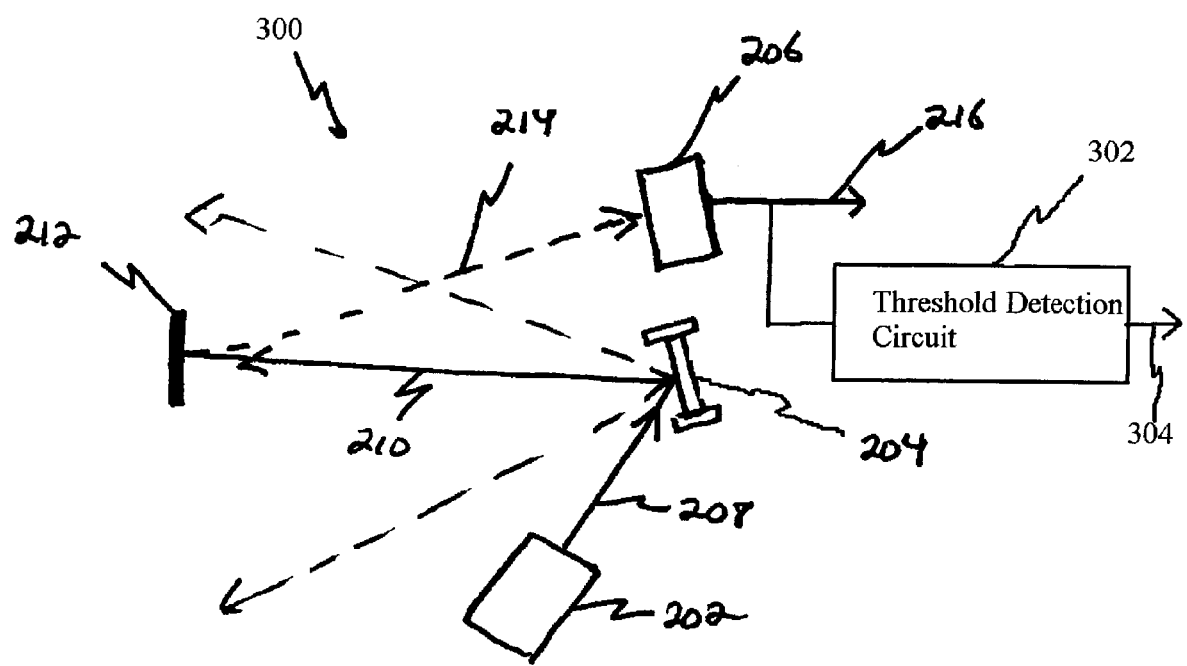
FIG. 3 is a block diagram of a portion of another exemplary combined EAS device and barcode scanner including another EAS range finder system consistent with the invention.

Another embodiment 300 of an EAS/Scanner including a range finder system consistent with the invention is illustrated in FIG. 3. Again, the laser emits a light beam 208 that is directed toward the mirror 204, which oscillates to reflect the laser output 208 as a scanner output 210 that sweeps across a barcode 212. Light 214 reflected from the barcode 212 is sensed by the light sensitive element 206, which provides an output 216 representative of the barcode. In the illustrated exemplary embodiment, a threshold detection circuit 302 coupled to the output 216 of the light sensitive element 206.

The threshold detection circuit 302 may compare the output 216 of the light sensitive element with a predetermined or adjustable threshold to ascertain whether the EAS device is within an operational distance. When a threshold level is reached, the threshold decision circuit may provide an output 304 that causes an audible or visual indication that the EAS device is within an operational distance. For example, as the distance between the device and article carrying the EAS tag is decreased, the light sensed by the light sensitive element may increase. The threshold decision circuit 302 may compare a voltage level of the output 216, which is representative of the intensity of the light imparted on the light sensitive element 206, with a predetermined or adjustable voltage threshold level. When the threshold voltage level is reached the threshold decision circuit 302 may provide an output 304, e.g. to the user interface, causing a visual and/or audible indication that the EAS device is at an operational distance.

The threshold voltage level may be adjusted by an operator, e.g. through a potentiometer, for a particular application, or may be predetermined. To set a predetermined threshold level, the expected reflectivity of articles carrying EAS tags to be detected or modified should be considered. For example, the worst and best case reflectivity conditions may be taken into account when determining the amount of reflected light necessary to provide an output signal indicating that the EAS tag is at an operational distance. The sampling rate of the light sensitive element may also be varied depending on a variety of factors.

An EAS range finder system 108 consistent with the invention may include a variety of other mechanisms for determining whether an EAS system is within an operational distance from an EAS tag. For example, one of a variety of energy forms may be directed toward the barcode and an associated detection element may be used to detect the energy reflected by the barcode. The amount of reflected energy may then be compared to a predetermined energy level based on a number of factors to ascertain an approximate distance of the barcode from the scanner.

A system consistent with the invention may include, for example, ultrasonic energy devices, acoustic energy devices, microwave energy devices, or electromagnetic energy devices. Ultrasonic energy devices may be used to transmit and detect reflected ultrasonic waves to detect the distance to a target to determine whether the EAS device is within an operational range. Similarly, acoustic energy devices may be used to transmit and detect reflected acoustic waves to detect the distance of the target. An electromagnetic device may utilize an antenna to transmit and receive electromagnetic energy. The antenna in a handheld EAS/Scanner may be utilized for this purpose as long as the antenna is configured to emit an electromagnetic signal at an appropriate frequency. Alternatively, a separate antenna may also be utilized for this specific purpose.

In other instances, the time it takes to reflect energy from the barcode or article back to the scanner may also be utilized. For instance, an optical time of flight sensor may utilize the time it takes a light beam to be transmitted and reflected back to calculate the distance to the target. The measurement method may analyze a single trip or may calculate the measured range of a number of trips.

It will be appreciated that the functionality described for the embodiments of the invention may be implemented using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, readonly memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, the processor and machine-readable medium may be part of a larger system that may contain various combinations of machine-readable storage devices through various I/O controllers, which are accessible by the processor and which are capable of storing a combination of computer program instructions and data.

The embodiments that have been described herein, however, are but some of the several which utilize this invention and are set forth here by way of illustration but not of limitation. For example, various features and advantages described herein may be combined or used separately. It is obvious that many other embodiments, which will be readily apparent to those skilled in the art, may be made without departing materially from the spirit and scope of the invention.

What is claimed is:

1. An electronic article surveillance (EAS) system comprising:

an EAS device configured for modifying an activation state of an EAS tag; and an EAS range finder system configured for providing a visible operational indication when said EAS device is within an operational distance from said EAS tag sufficient for modifying said activation state of said EAS tag, said visible operational indication having a first visible characteristic when said EAS device is outside of said operational distance and a second visible characteristic different from said first visible characteristic when said EAS device is within said operational distance;

said EAS range finder system comprising a light source for providing the operational indication that is visible on at least an article carrying said tag.

2. The EAS system of claim 1, wherein said light source comprises a barcode scanner.

3. The EAS system of claim 2, wherein said barcode scanner comprises a barcode scanner light source and a mirror configured to reflect said barcode scanner light source on said article carrying said tag, and wherein said EAS range finder system comprises a controller configured to control said mirror for establishing said first visible characteristic.

4. The EAS system of claim 1, wherein said light source provides a generally annular pattern that is visible on said article carrying said tag when said EAS device is outside of said operational distance, and wherein said annular pattern collapses as said distance between said EAS tag and said EAS device is decreased to establish a visible area when said EAS device is within said operational distance.

5. An electronic article surveillance (EAS) system comprising:

an EAS device configured for modifying an activation state of an EAS tag; and an EAS range finder system configured for providing an operational indication when said EAS device is within a distance from said EAS tag sufficient for modifying said activation state of said EAS tag, wherein said EAS range finder system comprises an energy source for transmitting energy and a detector for detecting a reflected portion of said energy reflected from an article carrying said EAS tag, and wherein said operational indication is provided in response to said reflected portion of said energy;

said operational indication visible on at least the article carrying said tag and having a first visible characteristic when said EAS device is outside of said distance and a second visible characteristic different from said first visible characteristic when said EAS device is within said distance.

6. The EAS system of claim 5, wherein said operational indication is provided in response to a detected intensity of said reflected portion of said energy.

7. The EAS system of claim 5, wherein said detector comprises a threshold decision circuit for providing a threshold decision circuit output when a characteristic of said reflected portion of said energy exceeds a threshold level, and wherein said operational indication is provided in response to said threshold decision circuit output.

8. The EAS system of claim 5, wherein said energy source comprises a light source, and wherein said detector comprises a light sensitive element.

9. The EAS system of claim 8, wherein said light source comprises a barcode scanner.

10. The EAS system of claim 5, wherein said energy source comprises an electromagnetic energy source.

11. The EAS system of claim 5, wherein said energy source comprises an acoustic energy source.

12. A combined EAS/Scanner system comprising:
an EAS device configured for modifying an activation state of an EAS tag;
a barcode scanner for scanning a barcode; and
an EAS range finder system configured for providing an operational indication when said EAS device is within an operational distance from said EAS tag sufficient for modifying said activation state of said EAS tag, wherein said barcode scanner comprises a barcode scanner light source and a mirror configured to reflect said barcode scanner light source on an article carrying said tag, and wherein said EAS range finder system comprises a controller configured to control said mirror for establishing a barcode scanner output that is visible on said article carrying said tag;

said output having a first visible characteristic when said EAS device is outside of said operational distance and a second visible characteristic different from said first visible characteristic when said EAS device is within said operational distance.

13. The system of claim 12, wherein said output has visible characteristics oriented in a first pattern when said EAS device is outside of said operational distance, and wherein said visible characteristics converge as a distance between said EAS tag and said EAS device is decreased to establish a second pattern when said EAS device is within said operational distance, said operational indication comprising said second pattern.

14. The system of claim 12, wherein said controller is configured to control said mirror for establishing said barcode scanner output in a generally annular pattern that is visible on said article carrying said tag when said EAS device is outside of said operational distance, and wherein the annular pattern collapses as a distance between said EAS tag and said EAS device is decreased to establish a visible circle when said EAS device is within said operational distance, said operational indication comprising said visible circle.

15. The system of claim 12, wherein said operational indication is a visible indication.

16. The system of claim 12, wherein said EAS range finder system comprises an energy source for transmitting energy and a detector for detecting a reflected portion of said energy reflected from an article carrying said EAS tag, and wherein said operational indication is provided in response to said reflected portion of said energy.

17. The system of claim 16, wherein said operational indication is provided in response to a detected intensity of said reflected portion of said energy.

18. The system of claim 16, wherein said detector comprises a threshold decision circuit for providing a threshold decision circuit output when a characteristic of said reflected portion of said energy exceeds a threshold level, and wherein said operational indication is provided in response to said threshold decision circuit output.

19. The system of claim 16, wherein said energy source comprises a light source, and wherein said detector comprises a light sensitive element.

20. The system of claim 19, wherein said light source comprises said barcode scanner.

21. The EAS system of claim 16, wherein said energy source comprises an electromagnetic energy source.

22. The EAS system of claim 16, wherein said energy source comprises an acoustic energy source.

* * * * *